United States Patent [19]
Seemann, III et al.

[11] Patent Number: 5,958,325
[45] Date of Patent: *Sep. 28, 1999

[54] LARGE COMPOSITE STRUCTURES AND A METHOD FOR PRODUCTION OF LARGE COMPOSITE STRUCTURES INCORPORATING A RESIN DISTRIBUTION NETWORK

[75] Inventors: William H. Seemann, III, Pass Christian, Miss.; George C. Tunis, III, Wilmington; Andrew P. Perrella, Hockessin, both of Del.; Rikard K. Haraldsson, Elkton, Md.; William E. Everitt, Hockessin, Del.; Everett A. Pearson, Warren, R.I.

[73] Assignee: TPI Technology, Inc., Warren, R.I.

[*] Notice: This patent issued on a continued prosecution application filed under 37 CFR 1.53(d), and is subject to the twenty year patent term provisions of 35 U.S.C. 154(a)(2).

[21] Appl. No.: 08/475,849

[22] Filed: Jun. 7, 1995

[51] Int. Cl.$^6$ ................................................ B29C 70/36
[52] U.S. Cl. .......................... 264/510; 264/511; 264/258; 264/571; 264/257
[58] Field of Search .................................... 264/510, 263, 264/DIG. 14, 257, 259, 271.1, 154, 155, 511, 571, 258, 317

[56] References Cited

U.S. PATENT DOCUMENTS

| | | | |
|---|---|---|---|
| 2,913,036 | 11/1959 | Smith | 154/1.6 |
| 3,146,148 | 8/1964 | Mitchella et al. | 156/382 |

(List continued on next page.)

FOREIGN PATENT DOCUMENTS

| | | | |
|---|---|---|---|
| 1504274 | 2/1968 | France . | |
| 503098 | 1/1975 | Japan . | |
| 0117079 | 10/1978 | Japan | 264/510 |
| 3162933 | 7/1991 | Japan . | |
| 9200963 | 1/1993 | Netherlands . | |

OTHER PUBLICATIONS

P. Lazarus, "Reverse MACT", Professional BoatBuilder Magazine, Oct./Nov., 1994, No. 31, p. 3.
P. Lazarus, "Infusion!", Part One, Professional BoatBuilder Magazine, Oct./Nov., 1994, No. 31.
P. Lazarus, "Infusion", Part Two, Professional BoatBuilder Magazine, Dec./Jan., 1995, No. 32, pp. 28–34.
Film Technology, Inc., advertisement for Quick Draw™ Films, High–Performance Composites 1995 Sourcebook, p. 29.
W. Sutliff, "Composites Promise Affordable Ship Structures", Centerline, May–Jun., 1991, pp. 1–4.
L.H. Walker, "Low Cost, High Quality Composite Ship Structures Technology Demonstrated", Research Release, Carderock Division, Naval Surface Warfare Center, May 1993, pp. 1–4.
*SCRIMP Systems*, product brochure.

*Primary Examiner*—Mathieu D. Vargot

[57] ABSTRACT

Large composite structures are produced using a vacuum assisted resin transfer molding process incorporating a resin distribution network. The structure includes cores each having a main feeder groove or channel therein. A resin distribution network is provided adjacent the core surface in fluid communication with the feeder groove. In a first embodiment, the resin distribution network comprises a plurality of microgrooves formed in each core surface. In a second embodiment, the resin distribution network comprises a separate distribution medium surrounding each core. Each core and associated resin distribution network is covered with a fiber material. The dry lay-up is placed against a mold and encapsulated in a vacuum bag. Uncured resin is fed under vacuum directly into the main feeder groove in each core via a fitting through the bag. The resin flows from the main feeder groove through the resin distribution network and outwardly into the fiber material and is allowed to cure. The resin distribution network forms an integral part of the finished structure. The fiber material with cured resin between adjacent cores may comprise various structural members.

40 Claims, 4 Drawing Sheets

U.S. PATENT DOCUMENTS

| | | | |
|---|---|---|---|
| 3,309,450 | 3/1967 | Rodgers . | |
| 3,666,600 | 5/1972 | Yoshino | 264/510 |
| 3,710,733 | 1/1973 | Story | 264/510 |
| 3,855,029 | 12/1974 | Sabel | 264/263 |
| 4,125,526 | 11/1978 | McCready . | |
| 4,132,755 | 1/1979 | Johnson | 264/553 |
| 4,217,157 | 8/1980 | Stoltze et al. | 156/87 |
| 4,238,437 | 12/1980 | Rolston | 264/102 |
| 4,312,829 | 1/1982 | Fourcher | 264/571 |
| 4,359,437 | 11/1982 | Le Comte | 264/102 |
| 4,560,523 | 12/1985 | Plumley et al. | 264/102 |
| 4,622,091 | 11/1986 | Letterman | 264/510 |
| 4,676,041 | 6/1987 | Ford | 52/309.11 |
| 4,822,436 | 4/1989 | Callis et al. | 156/211 |
| 4,902,215 | 2/1990 | Seeman, III | 425/406 |
| 4,942,013 | 7/1990 | Palmer et al. | 264/511 |
| 4,975,311 | 12/1990 | Lindgren | 428/156 |
| 5,045,251 | 9/1991 | Johnson | 264/40.1 |
| 5,052,906 | 10/1991 | Seeman | 425/112 |
| 5,087,193 | 2/1992 | Herbert, Jr. | 425/543 |
| 5,096,651 | 3/1992 | Le Comte | 264/510 |
| 5,123,985 | 6/1992 | Evans et al. | 156/213 |
| 5,129,813 | 7/1992 | Shepherd | 425/504 |
| 5,132,069 | 7/1992 | Newton | 264/257 |
| 5,242,651 | 9/1993 | Brayden et al. | 264/510 |
| 5,256,366 | 10/1993 | Wejrock et al. | 264/510 |
| 5,266,249 | 11/1993 | Grimes, III et al. | 264/263 |
| 5,304,339 | 4/1994 | Le Comte | 264/511 |
| 5,316,462 | 5/1994 | Seemann | 425/112 |
| 5,344,601 | 9/1994 | Newton | 264/510 |
| 5,433,165 | 7/1995 | McGuiness et al. | 264/510 |
| 5,439,635 | 8/1995 | Seeman | 264/510 |
| 5,500,164 | 3/1996 | Livesay et al. | 264/510 |
| 5,526,767 | 6/1996 | McGuiness et al. | 264/510 |
| 5,576,030 | 11/1996 | Hooper | 264/571 |

LARGE COMPOSITE STRUCTURES AND A METHOD FOR PRODUCTION OF LARGE COMPOSITE STRUCTURES INCORPORATING A RESIN DISTRIBUTION NETWORK

FIELD OF THE INVENTION

This invention relates to the production of fiber reinforced resin composite structures, and in particular to processes for vacuum assisted resin transfer molding of large composite structures.

BACKGROUND OF THE INVENTION

Vacuum assisted resin transfer molding (VA-RTM) has been used to produce a number of large, fiber reinforced composite structures such as boat hulls which incorporate materials such as foam and balsa cores. The cores are covered with a fiber reinforced resin. In the VA-RTM process, the reinforcement fiber, such as a fabric or mat, is arranged in a single sided mold in a dry condition along with the desired core materials according to the form of the desired finished part. The lay-up is then encapsulated in a vacuum bag and impregnated with resin under vacuum. The resin is allowed to cure.

Various methods have been utilized to introduce and enhance the distribution of resin through the reinforcement fiber. These methods include the placement of a disposable distribution media over the outside layer of fabric and the incorporation of holes and/or slots penetrating through the core to allow resin to flow from the outer to the inner layer of reinforcement fiber. See, for example, U.S. Pat. Nos. 5,316,462 and 4,560,523. A supply groove in a foam core has also been used in a closed mold resin injection process to facilitate resin flow. See, for example, U.S. Pat. No. 5,096,651.

SUMMARY OF THE INVENTION

The present invention relates to a method for distributing resin during the manufacture of large composite structures using a vacuum assisted resin transfer molding (VA-RTM) process and the composite structure produced by this method. The composite structure is formed from internal cores surrounded by fiber reinforced resin. In one embodiment of the invention, resin is supplied directly into a network of main feeder grooves which are interconnected to a series of smaller microgrooves formed in the surface of the internal cores. From the feeder grooves and microgrooves, the resin flows outwardly from the core to penetrate the reinforcement fiber. In a second embodiment of the invention, a separate distribution medium is interposed between the internal core and the fiber reinforcement. The resin is supplied directly to one or more main feeder grooves in the core surface and penetrates the reinforcement fiber via the distribution medium. Also, the main feeder grooves can extend around the cores to form supply loops, allowing impregnation of transverse structural members.

With this method, large composite structures which require multiple cores can be formed quickly prior to the gel time of typical vinyl ester or polyester resins, and the amount of resin used can be minimized. By supplying the resin directly through the vacuum bag into the feeder grooves, the supply is not limited to a part edge or inlet in a tool. Adjacent cores can be supplied via a single resin inlet. The resin distribution network remains in the finished part, eliminating disposal of distribution materials. The microgrooves are filled with resin after curing, thereby increasing interlaminar shear strength and delamination strength. Structural features such as shear ties, compression webs, or beams can be incorporated directly into the composite part during the molding process.

DESCRIPTION OF THE DRAWINGS

The invention will be more fully understood from the following detailed description taken in conjunction with the accompanying drawings in which.

DETAILED DESCRIPTION OF THE INVENTION

Figure 1:
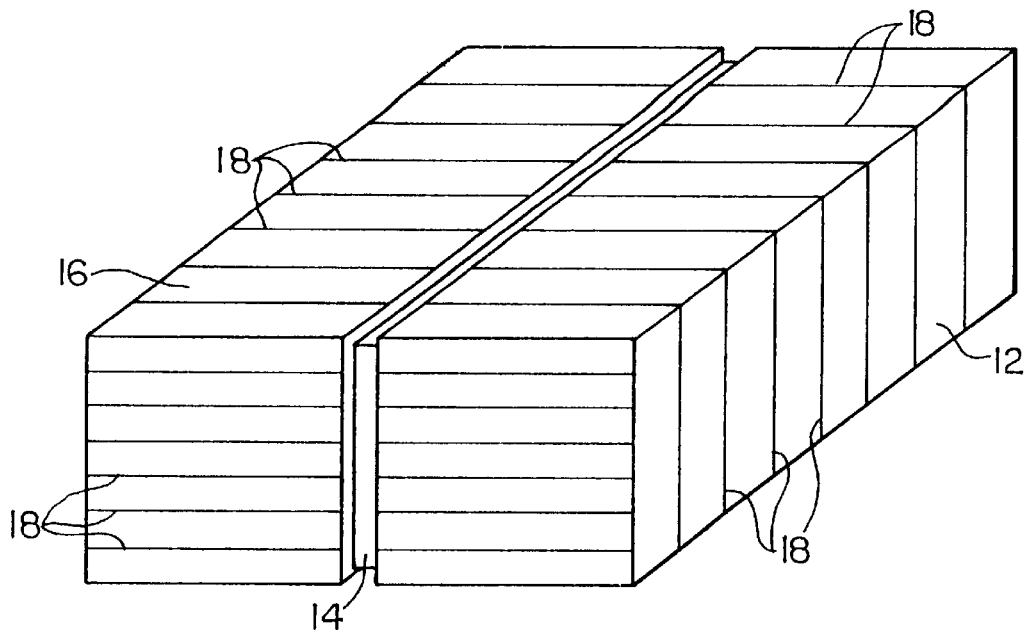
FIG. 1 is a perspective view of a core for a composite structure according to a first embodiment of the present invention.

A large composite part made according to the present invention includes a core 12, shown in FIG. 1. The core is made from a material able to support the pressure of a vacuum. Typical materials include foams, such as a polyurethane or a polyvinyl chloride, or balsa wood. The core can be solid or hollow, such as a blown polyethylene. Concrete may also be used. The core is shown as a rectangular block, although other configurations are possible, as discussed further below.

One or more main feeder grooves or channels 14 are provided in the surface 16 of the core. The main feeder groove may circumscribe the entire core to form a loop. A resin distribution network comprising channels of a smaller cross-sectional area than the main feeder groove is provided in contact with the surface of the core for fluid communication with the main feeder groove.

In a first embodiment of the present invention, the resin distribution network is provided in the form of a plurality of microgrooves 18 machined in the surface 16 of the core 12, as shown in FIG. 1. The microgrooves 18 are generally arranged transversely to the main feeder groove 14. Some of the microgrooves may circumscribe the entire core to create a resin flow loop beginning and ending at the main feeder groove. The actual relation of the microgrooves to the main feeder groove depends on the geometry of the core and the optimization of the resin impregnation, as discussed further below.

Figure 2:
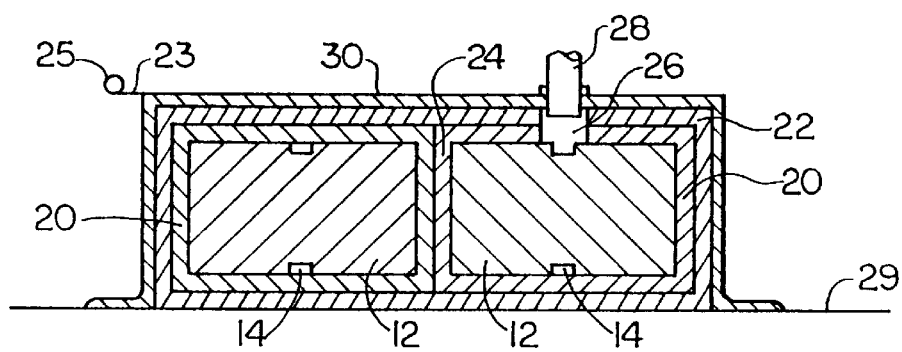
FIG. 2 is a schematic cross-sectional view of a composite structure being formed according to the first embodiment of the present invention.

The core 14 with the network of grooves is covered with one or more layers of a fiber material 20, illustrated schematically in FIG. 2. The fiber material may be a cloth or mat formed from fibers of glass, carbon, or other suitable material. Depending on the structural requirements of the desired finished part, the core may be completely surrounded with fiber material, or one or more surfaces of the core may be left free of fiber material. The fiber material may be wrapped in a sheet around the core, or individual pieces of fiber material may be applied to the desired core faces. The fiber may also be supplied in a tubular form into which the core is inserted.

A plurality of fiber wrapped cores are arranged to form the desired finished part. Although two cores are shown in FIG. 2, the actual number and arrangement of cores is determined by the desired finished part. One or more layers of a fiber material can be wrapped around a plurality of cores to form an outer skin 22, shown schematically in FIG. 2. The particular number of layers of fiber material, the type, and the arrangement depend on the desired finished part and can be readily determined by those of skill in the art. A bleeder layer is generally provided in the form of a tab 23 extending from an outer fiber layer to a vacuum outlet 25. Peel plies, typically required with prior art vacuum processes, are generally not needed with the process of the present invention.

The fiber material 24 surrounding and between the cores creates structural members such as shear ties, compression webs, and beams. For example, referring to FIG. 4, a plurality of triangular cores 40 are used to form a deck. The fiber material between adjacent triangular cores forms diagonal structural members 41 that support both compression and shear forces.

During the lay-up, suitable fittings 26, such as plastic or copper tees, are positioned in the main feeder grooves 14 to facilitate the subsequent insertion of resin supply tubes 28. One or more fittings may be positioned in each feeder groove, to accommodate the desired resin flow. The lay-up is placed against a mold 29, and a vacuum bag 30 is then placed over the lay-up, including the plastic fittings, and sealed to the mold in a manner known in the art, as shown schematically in FIG. 2. The vacuum bag is then punctured and the supply tubes 28 are inserted through the vacuum bag directly into their respective fittings 26. The supply tubes are sealed to the bag to retain vacuum integrity. In this manner, the main feeder grooves are supplied directly with resin by penetrating the outer vacuum bag with a supply tube that is inserted directly into the groove.

Figure 8:
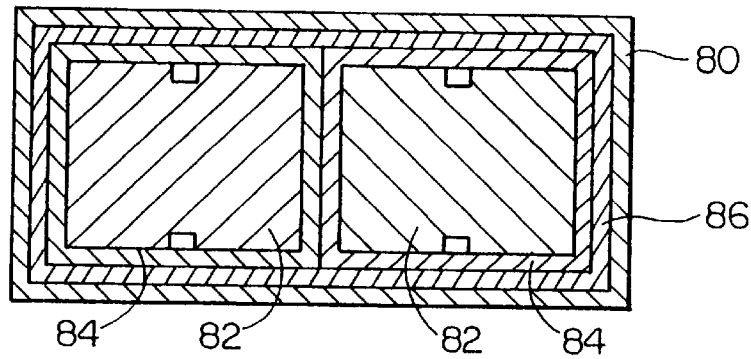
FIG. 8 is a schematic cross-sectional view of a composite structure being formed using an integrated mold and vacuum structure.

Referring to FIG. 8, the vacuum bag and mold may also be integrated into a single structure 80 which is rigid enough to retain its shape as a mold but flexible enough to collapse against the part upon application of a vacuum. For example, the integrated structure 80 may comprise a thin gauge steel sheet, such as 0.25 inch or thinner. The cores 82 and fiber material 84, 86, as described above, are encapsulated in the steel sheet. Holes are drilled through the sheet to access the fittings. Resin impregnation occurs as described above. The integrated structure may be formed of other suitable materials, such as rubber or silicone or a thin composite sheet material such as a plastic laminated metal.

Figure 9:
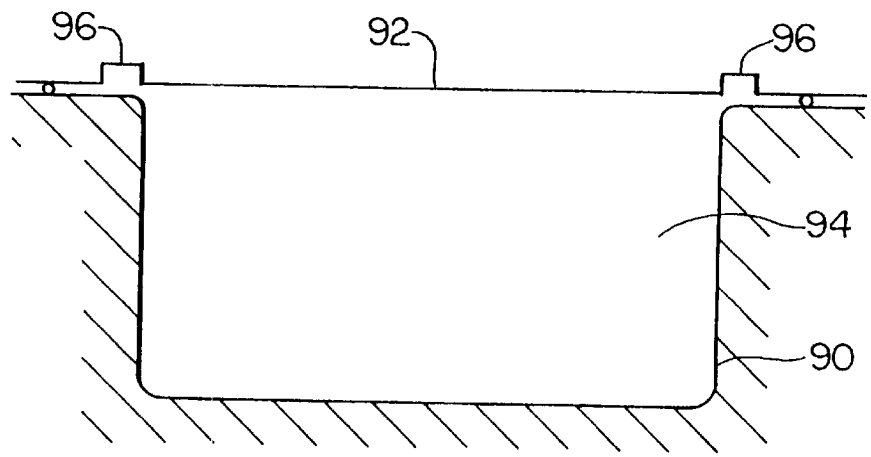
FIG. 9 is a schematic cross-sectional view of a rigid mold and flexible lid for forming a composite structure.

FIG. 9 illustrates a further mold embodiment in which a rigid mold 90 is sealed with a flexible lid 92 formed, for example, from a steel or plastic material. A part, comprising the cores and fiber material as described above, is placed in the recess 94 defined by the rigid mold. A vacuum groove 96 in the lid surrounds the part. Holes are provided through the lid or mold to access fittings for resin impregnation as described above. During impregnation of the resin under vacuum, the lid flexes at the edge of the vacuum groove, to allow compaction of the part.

Figure 3:
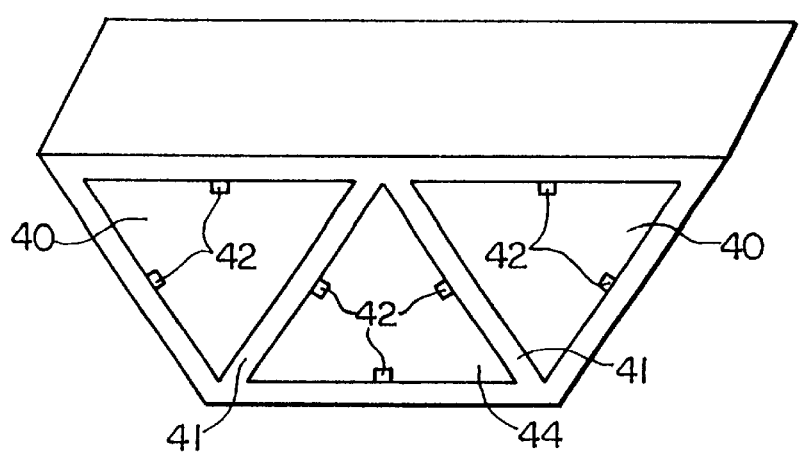
FIG. 3 is a schematic perspective view of a further composite structure being formed according to the present invention.
Figure 4:
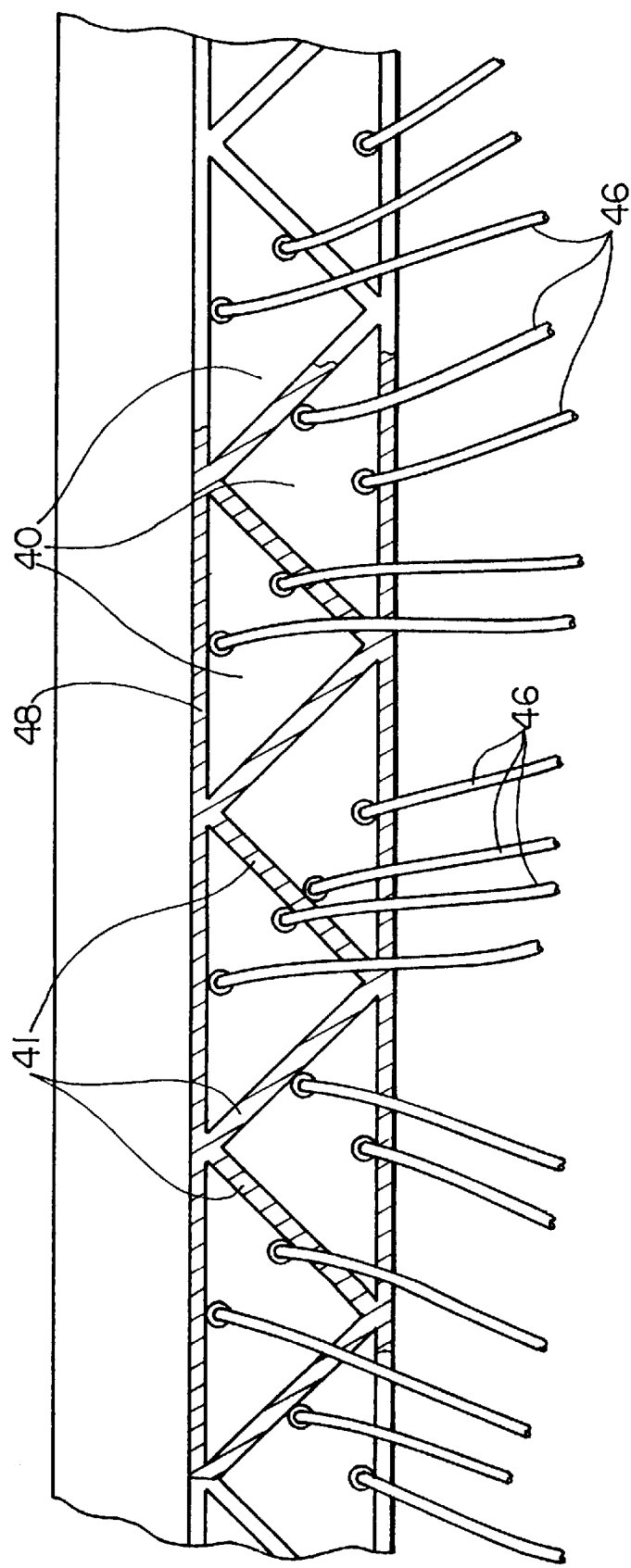
FIG. 4 is a perspective view of a composite structure being formed according to the present invention.

The resin, such as a polyester, vinyl ester, epoxy, phenolic, acrylic, or bismaleimide, travels relatively quickly through the main feeder grooves 14 and into the microgrooves 18. From the microgrooves, the resin penetrates the fiber material 20, 22. Impregnation results from resin infusion originating at the core surface 16 and migrating outwardly to the exterior of the part. The fiber material on adjacent core surfaces may be impregnated via a main feeder groove in one of the adjacent cores, as indicated in FIGS. 3 and 4.

Figure 10:
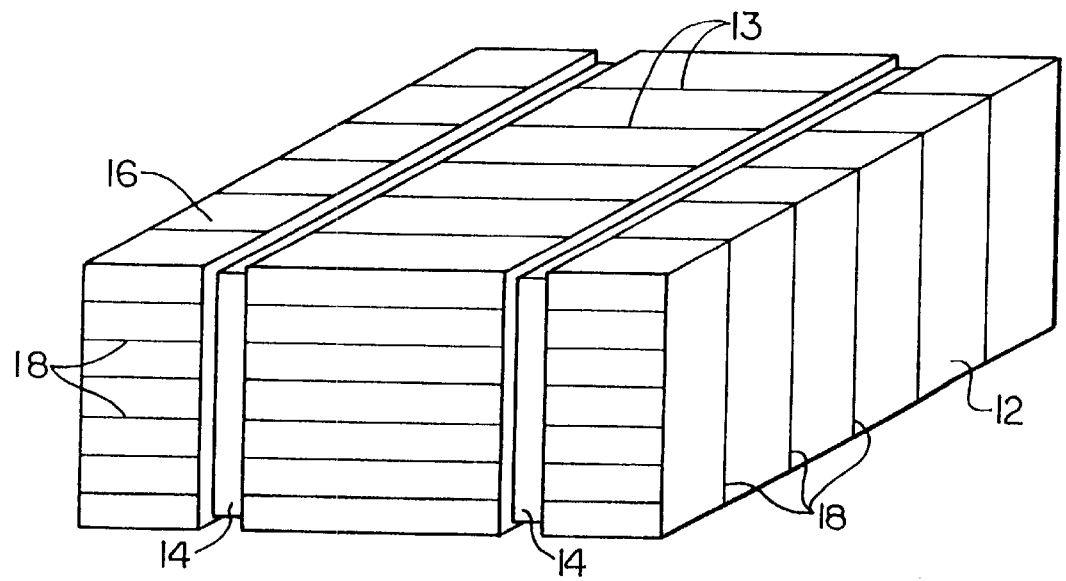
FIG. 10 is a perspective view of a core for a composite structure having multiple main feeder grooves.

The cross-sectional area of the main feeder groove and the cross-sectional area and spacing of the microgrooves are optimized to provide a suitable time to allow the resin to impregnate all of the fiber material before curing without leaving unimpregnated areas. A typical main feeder groove may have a depth of 0.5 inch and a width of 0.5 inch for a cross-sectional area of 0.25 square inches. Typical microgrooves may have a depth of 0.125 inch and a width of 0.125 inch for a cross-sectional area of approximately 0.016 square inches. The microgrooves may be spaced 1.0 inch on center. These dimensions may be modified to accommodate reinforcement fiber materials of different types and/or thicknesses. Also, the cross-sectional area of the main feeder grooves may be increased if the part is particularly large to more rapidly distribute the resin to all sections of the part. Similarly, multiple main feeder grooves 14 may be provided in a core 12, as indicated in FIG. 10.

In addition, the cross-sectional area of the main feeder grooves or the microgrooves may be reduced to create flow restrictions to increase resin dwell time at a particular area. Resin dwell time may also be increased by placing a resin "fuse" in the feeder groove which temporarily blocks the resin flow. The fuse dissolves after contact with the resin after a known period of time, which may be set by the length of the fuse. For example, with a vinyl ester resin, a styrofoam fuse has been used successfully. The feeder grooves may also terminate to redirect resin flow.

The main feeder grooves 14 allow passage of resin from one core to an adjacent core. Holes may be provided through the cores to connect main feeder grooves. Each main feeder groove may be supplied with resin simultaneously, creating parallel circuits, or in a prescribed sequence, creating series circuits, depending on the geometry and size of the part to be impregnated. Additionally, the main feeder grooves may be independent of each other, creating separate circuits.

After impregnation, the resin is allowed sufficient time to cure. Once cured, the microgrooves 18 are filled with solid resin. This resin provides a lateral locking mechanism which improves the interlaminar shear strength of the bond between the fiber reinforced composite and the core. The resin remaining in the groove network also increases the forces necessary to delaminate the fiber reinforced face skins from the core.

The actual arrangement and shape and number of cores depends on the desired finished part. For example, triangular cores 40 are shown in FIG. 3. The triangular cores may have main feeder grooves 42 provided in at least two surfaces. A central triangular core 44 may have main feeder grooves in three surfaces. Microgrooves are provided in the surfaces as described above. A plurality of triangular cores may be arranged in, for example, a row to form a deck. In this example, resin, supplied through tubes 46, is impregnated sequentially beginning at the central core and progressing toward the edges, as shown by the shaded region 48 in FIG. 4.

Figure 5:
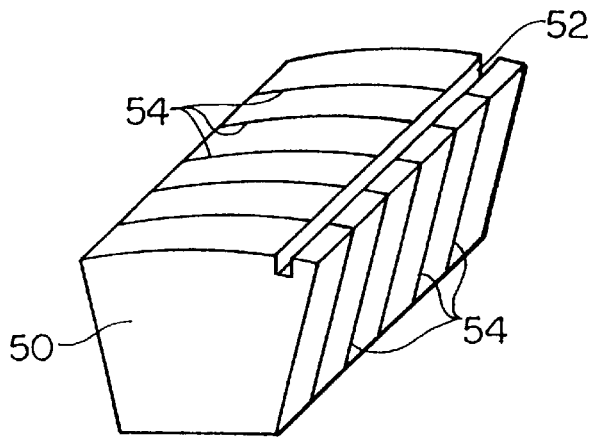
FIG. 5 is a perspective view of a further core for a composite structure according to the present invention.

An arcuate core 50 is shown in FIG. 5. The arcuate core 50 may have a main feeder groove 52 in one surface and a network of microgrooves 54 radiating from the feeder groove to circumscribe the core. The arcuate cores may be used to form curved structures such as boat hulls or arches.

Figure 6:
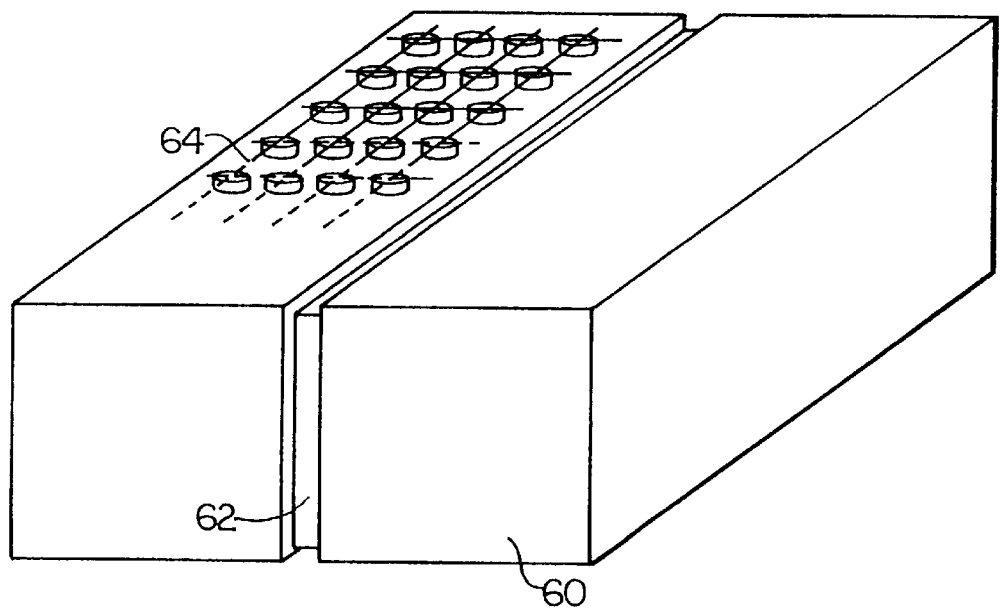
FIG. 6 is a perspective view of a core for a composite structure according to a second embodiment of the present invention.
Figure 7:
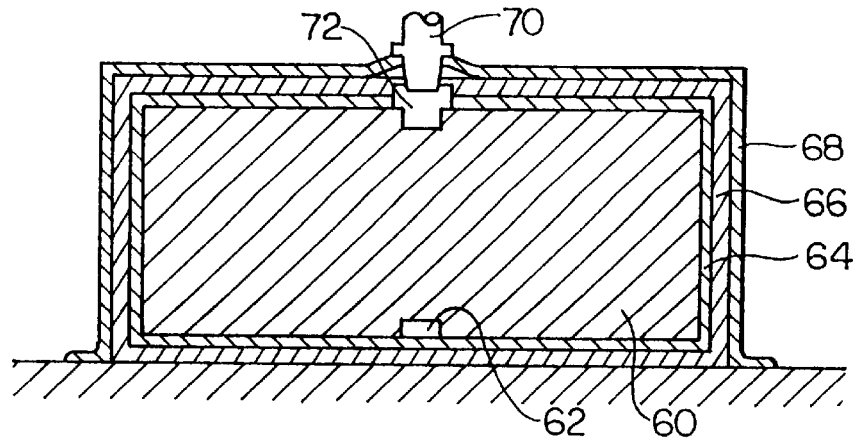
FIG. 7 is a schematic cross-sectional view of a composite structure being formed according to the second embodiment of the present invention.

In another embodiment of the present invention, illustrated in FIGS. 6 and 7, a core 60 is provided with a main feeder groove 62 as described above. A distribution medium 64 is then provided adjacent the core faces. The medium comprises a network of open passageways formed by a structure capable of maintaining the passageways in an open condition during application of the vacuum. For example, the medium may comprise intersecting filaments held in spaced relation from the core surface by post-like members located at each filament intersection, a grid-like structure of aligned strips, or an open weave fabric. Suitable distribution media are known for example, from U.S. Pat. Nos. 4,902,215 and 5,052,906, incorporated herein by reference. A fiber material 66 is then wrapped over the distribution media, as described above. A plurality of cores are arranged to form the desired finished part, and a vacuum bag 68 is placed over the cores and fiber material, as described above. Resin supply tubes 70 leading from a resin source are inserted through the bag 68 and fiber material 66 to fittings 72 in the main feeder grooves 62. The supply tubes 70 are sealed to the vacuum bag in a manner known in the art. Resin is fed through the supply tubes to the main feeder grooves. The resin travels relatively quickly through the main feeder grooves and into the distribution media. From the distribution media, the resin penetrates the fiber material. A suitable time interval is provided to allow the resin to cure.

Resin distribution media presents a more uniform resin flow front than the microgrooves. For this reason, resin distribution media are generally preferred for more complicated parts, whereas microgrooves are preferred to conserve resin, since less resin flows through the microgrooves.

The invention is not to be limited by what has been particularly shown and described, except as indicated by the appended claims.

We claim:

1. A method of forming a composite structure comprising:
   providing a core having a peripheral surface and a feeder channel formed to lie across at least a portion of said peripheral surface of said core, said feeder channel having a first cross-sectional area;
   providing a resin distribution network adjacent at least a portion of said peripheral surface and in fluid communication with said feeder channel in said peripheral surface, said resin distribution network comprising a network of grooves formed in said peripheral surface of said core extending from said feeder channel, each of said grooves having a second cross-sectional area smaller than the first cross-sectional area of the feeder channel;
   covering at least a portion of said core and said resin distribution network with a fiber material;
   providing a forming structure, at least a first portion of said forming structure comprising a mold and at least a further portion of said forming structure comprising a flexible portion collapsible under vacuum against an adjacent portion of said core;
   sealing said core and said fiber material in said forming structure;
   connecting a source of uncured resin directly to said feeder channel through said forming structure;
   connecting an interior of said forming structure to a vacuum outlet;
   forcing said uncured resin initially through said feeder channel and said resin distribution network to said vacuum outlet to fill the interior of said forming structure between said core and said forming structure to impregnate said fiber material;
   wherein said feeder channel and said distribution network are sized and arranged to allow said uncured resin to completely fill said fiber material covering said core prior to curing; and
   curing said uncured resin to form a composite structure.

2. The method of claim 1, wherein said grooves are arranged transversely to said feeder channel.

3. The method of claim 1, wherein at least a portion of said grooves circumscribe said core to form a loop beginning and terminating at said feeder channel.

4. The method of claim 1, further comprising placing at least one connection fitting in said feeder channel prior to covering said core and said resin distribution network with said fiber material.

5. The method of claim 4, wherein said step of connecting said source of uncured resin to said channel comprises forming a hole in said forming structure at said connection fitting and inserting a supply tube from said source into said connection fitting.

6. The method of claim 1, further comprising providing a further core having a further peripheral surface and a further feeder channel formed to lie across said further peripheral surface of said further core, said core and said further core arranged adjacently to form a desired finished part.

7. The method of claim 6, wherein said feeder channel and said further feeder channel are generally aligned to allow passage of said uncured resin between said core and said further core.

8. The method of claim 7, further comprising covering said core and said further core with a further fiber material.

9. The method of claim 1, wherein said forming structure comprises a thin steel sheet.

10. The method of claim 1 wherein said forming structure comprises a rigid mold and a flexible bag.

11. The method of claim 1, wherein said forming structure comprises a rubber bag.

12. The method of claim 1, wherein said forming structure comprises a silicone bag.

13. The method of claim 1, wherein said forming structure comprises a thin composite sheet material.

14. The method of claim 1, wherein said mold comprises a rigid mold and said flexible portion comprises a flexible lid.

15. The method of claim 14, wherein said lid includes a vacuum groove therein to surround a periphery of said core covered with said fiber material.

16. The method of claim 1, wherein said core comprises a foam material.

17. The method of claim 1, wherein said core comprises balsa wood.

18. The method of claim 1, wherein said core comprises concrete.

19. The method of claim 1, wherein said core comprises a block having a generally rectangular cross-section.

20. The method of claim 1, wherein said core comprises a block having a generally triangular cross-section.

21. The method of claim 1, wherein said core comprises a block having an arcuate face.

22. The method of claim 1, wherein a plurality of feeder channels are formed to lie across at least a portion of said peripheral surface of said core.

23. The method of claim 1, further comprising causing a delay in filling said forming structure with said uncured resin.

24. The method of claim 23, wherein said step of causing a delay comprises providing a material dissolvable by said uncured resin in a portion of said feeder channel.

25. The method of claim 23, wherein said step of causing a delay comprises narrowing a portion of said feeder channel.

26. A method of forming a composite structure comprising:

provoding a core having a peripheral surface and a feeder channel formed to lie across at least a portion of said peripheral surface of said core;

providing a resin distribution network adjacent at least a portion of said peripheral surface and in fluid communication with said feeder channel in said peripheral surface;

placing at least one connection fitting in said feeder channel;

covering at least a portion of said core and said resin distribution network with a fiber material;

placing said core and said fiber material in a mold;

sealing said core and said fiber material in a bag against said mold;

connecting a source of uncured resin directly to said feeder channel through said bag;

connecting an interior of said bag to a vacuum outlet;

forcing said uncured resin into said feeder channel and from said feeder channel to said resin distribution network and then to said vacuum outlet to impregnate said fiber material from said core outwardly toward said mold and said bag; and curing said uncured resin to form a composite structure.

27. The method of claim 26, wherein said grooves are arranged transversely to said feeder channel.

28. The method of claim 26, wherein at least a portion of said grooves circumscribe said core to form a loop beginning and terminating at said feeder channel.

29. The method of claim 26, wherein said step of connecting said source of uncured resin to said channel comprises puncturing said bag at said connection fitting and inserting a supply tube from said source into said connection fitting.

30. The method of claim 26, further comprising providing a further core having a further peripheral surface and a further feeder channel formed to lie across said further peripheral surface of said further core, said core and said further core arranged adjacently to form a desired finished part.

31. The method of claim 30, wherein said feeder channel and said further feeder channel are generally aligned to allow passage of said uncured resin between said core and said further core.

32. The method of claim 30, further comprising covering said core and said further core with a further fiber material.

33. The method of claim 26, wherein said feeder channel and said distribution network are sized and arranged to allow said uncured resin to completely fill said fiber material covering said core prior to said curing.

34. The method of claim 26, wherein said core comprises a foam material.

35. The method of claim 26, wherein said core comprises balsa wood.

36. The method of claim 26, wherein said core comprises concrete.

37. The method of claim 26, wherein said core comprises a block having a generally rectangular cross-section.

38. The method of claim 26, wherein said core comprises a block having a generally triangular cross-section.

39. The method of claim 26, wherein said core comprises a block having an arcuate face.

40. The method of claim 26, wherein a plurality of feeder channels are formed to lie across at least a portion of said peripheral surface of said core.

* * * * *